United States Patent

Haden

[11] 4,360,726
[45] Nov. 23, 1982

[54] ELECTRIC KETTLE

[75] Inventor: Denis H. Haden, Chestall, near Rugeley, England

[73] Assignee: D. H. Haden Limited, United Kingdom

[21] Appl. No.: 173,503

[22] Filed: Jun. 27, 1980

[30] Foreign Application Priority Data

Aug. 15, 1979 [GB] United Kingdom ................ 7928416
Jun. 5, 1980 [GB] United Kingdom ................ 8018507

[51] Int. Cl.³ ............................................ F27D 11/02
[52] U.S. Cl. ..................................... 219/441; 219/331; 219/437; 219/494; 219/512
[58] Field of Search ............... 219/330, 331, 437, 438, 219/439, 441, 442, 494, 512; 337/386; 99/282

[56] References Cited

U.S. PATENT DOCUMENTS

| 3,026,402 | 3/1962 | Russell | 219/441 |
| 3,539,774 | 11/1970 | Thornton | 219/442 |
| 3,725,643 | 4/1973 | Clausse | 219/441 |
| 3,784,788 | 1/1974 | Fourny | 219/441 |

FOREIGN PATENT DOCUMENTS

| 202689 | 5/1955 | Australia | 219/441 |
| 1383904 | 2/1975 | United Kingdom . | |
| 1408388 | 10/1975 | United Kingdom . | |
| 1408390 | 10/1975 | United Kingdom . | |
| 1439951 | 6/1976 | United Kingdom . | |
| 1457507 | 12/1976 | United Kingdom . | |
| 1470364 | 4/1977 | United Kingdom . | |
| 1470365 | 4/1977 | United Kingdom . | |
| 1470367 | 4/1977 | United Kingdom . | |
| 2042269 | 9/1980 | United Kingdom | 219/441 |
| 2042857 | 9/1980 | United Kingdom . | |
| 2045588 | 10/1980 | United Kingdom | 219/441 |

Primary Examiner—Volodymyr Y. Mayewsky
Attorney, Agent, or Firm—Neil F. Markva

[57] ABSTRACT

An electric kettle having a metal sheathed element 20 permanently mounted on a metal head 22 so as to produce a hot spot 29 and the switching means comprising a dry overload responsive actuating mechanism 14 responsive to overheating of the hot spot to open switch contacts 71, 72 mounted on an electrical insulating mounting 61, which supports a movable thrust member 74 which extends from the contacts through a way within the mounting to a steam responsive actuating mechanism 18 for actuation by the latter, and the mechanisms 14 and 18 are preferably assembled on the mounting 61 to form a pretestable assembly in which the contacts are disposed in a chamber 75 within the assembly.

14 Claims, 9 Drawing Figures

ELECTRIC KETTLE

FIELD OF THE INVENTION

This invention concerns improvements relating to electric kettles of the kind having a kettle body, an electrical immersion heater and switching means for controlling the immersion heater. The immersion heater comprises a metal sheathed heating element which is mounted on a metal head, and the head is mounted on the kettle body so as to project through a hole in the kettle body. The switching means projects outwardly from the kettle body and is electrically connected to the heating element which projects into the kettle body from the head.

BACKGROUND OF THE INVENTION

There are known a very large number of different switching means for electric kettles of the above kind, for example, there are "steam actuated switching means" to switch the kettle off when it boils, "dry overload switching means" to switch the kettle off if the immersion heater overheats, and manually operable "on/off switching means".

There are sold a very large number of electric kettles which have only a dry overload switching means, because they are relatively inexpensive and because the dry overload switching means are usually small enough to be inserted between the metal head and a molded plastics plug socket for an electrically supply cable connector, thereby to avoid having a large switch housing projecting from the kettle body. This type of kettle is known as a "non-automatic" kettle, and has the advantages of low manufacturing cost, simple manufacture, easy repair and durability; and only occasionally are there any warranty (guarantee) claims due usually to overheating.

There are also sold very large numbers of electric kettles of the type known as "automatic" kettles, which include steam actuated switching means, and usually also dry overload switching means. The steam actuated switching means normally controls the kettle so that the dry overload switching means becomes of secondary importance. In most automatic kettles there is a small vent near the top of the kettle body to allow steam to flow to the steam actuated switching means, and therefore there is a need to provide means for excluding steam and water condensate from the electrical contacts and electrical conductors of the switching means, thus making automatic kettles complicated and expensive to manufacture.

In order to reduce the cost of such automatic kettles it is known to use an on/off switching means which is manually operable to close or to open and close a single set of electrical switch contacts, and to mechanically (but not electrically) interconnect the mechanism of on/off switching means with a dry overload responsive actuating mechanism and a steam responsive actuating mechanism. This reduces the number of electrical components but gives rise to problems because steam and water can follow the mechanical interconnections of the actuating mechanisms to the electrical switch contacts, and the mechanical interconnections are difficult to adjust during manufacture and are prone to malfunctions in use, causing the kettle to switch off before it has boiled or not to switch off when it does boil, giving rise to expensive warranty claims.

Other automatic kettles have employed the more expensive alternative of using separate sets of electrical switch contacts in separate dry overload and steam actuated switching means, each set of contacts being individually protected from steam and condensate. However, these kettles are very expensive, difficult to repair and can suffer from electrical problems due to the large number of electrical contacts and connections, with resultant warranty costs.

A great amount of research and development has been devoted to reducing the cost of the component parts of the switching means for automatic kettles, and there are available to kettle manufacturers switch assemblies which are mass produced by switch manufacturers. Some of these switch assemblies incorporate both dry overload and steam actuated switching means. However, the kettle manufacturer has no way of fully testing such bought out switch assemblies until they have been incorporated into the kettles, so that any switch faults result in complete kettles having to be scrapped, or dismantled for salvage at very considerable cost to the kettle manufacturer. Furthermore, materials and manufacturing tolerances can give rise to incompatibility between some batches of switch assemblies and some batches of immersion heaters, and often this incompatibility can not be detected by the kettle manufacturer until after these parts have been incorporated into the kettle making them faulty. The resultant expense to the kettle manufacturer is large if the faulty kettles are detected by the kettle manufacturer, but can be very great if the faults in the kettles only become apparent after a period of use by customers. Thus these switch assemblies can result in an overall increase in costs, while not overcoming the previously discussed switching and other problems with automatic kettles.

There is a further problem with automatic kettles, in that if they are overfilled with water or tilted when full, water can flood out of the steam vent at a rate sufficient to flood the switching means, and hitherto the best answer to this problem has been to place the steam actuated switching means in the handle well above the water level, but this answer is expensive and requires lengthy electrical connections to the immersion heater.

PURPOSE OF THE INVENTION

An object of the invention is to provide means enabling a kettle manufacturer to produce improved automatic electric kettles at a reduced total manufacturing and warranty cost.

According to the present invention an electric kettle comprising a kettle body for holding liquid with an electrical immersion heater and switching means mounted thereon. The immersion heater comprises a metal sheathed element permanently mounted on a metal head so as to produce a hot spot on the head. The switching means comprises a set of electrical switch contacts, a dry overload responsive actuating mechanism responsive to overheating of the hot spot to open the set of switch contacts and a steam responsive actuating mechanism. The set of switch contacts, electrical connectors connected to the element and electrical connectors for receiving an electricity supply are all mounted on an electrical insulating mounting. The kettle is characterized in that:

(a) the set of switch contacts comprises a first contact movable in a first direction to open the set of contacts, and a second contact movable in the opposite direction to open the set of contacts;

(b) the dry overload responsive actuating mechanism is disposed between the mounting and the head so that a bimetal device of the dry overload mechanism abuts the hot spot, and includes a first movable member which extends from the bimetal device to the first contacts; and (c) the mounting supports a second movable member which extends from the second contact through a way within the mounting to the steam responsive actuating mechanism for actuation by the latter.

The movable members are preferably thrust members which are conveniently in the form of cylindrical push rods.

The dry overload responsive actuating mechanism preferably includes a thermal insulating member which is located on the mounting so as to confront the head, to support the bimetal device and to support slidably the first movable thrust member.

The use of two movable co-operating switch contacts causes the contacts to slide slightly across each other as the contacts are actuated, thereby making the contacts self cleaning. More importantly, the provision of a respective movable contact for each actuating mechanism (1) enables each actuating mechanism to be designed or modified without compromise or restriction caused by the design of the other, (2) presents the build up of cumulative manufacturing tolerances in one actuating mechanism being compounded or affected by the tolerances in the other mechanism, and (3) removes the need for two respective switches and the alternative disadvantages and limitations inherent in arranging both actuating mechanisms to operate one movable contact either directly or via the on/off mechanism of a switch.

The invetnion also gives the designer of the switching means considerable freedom of choice for constructing the switching means. For example either of two advantageous forms of mounting can be adopted.

In the first form the mounting is formed so that it is capable of being assembled together with the switch contacts, electrical connectors, the dry overload responsive actuating mechanism and the immersion heater to form a heater assembly which can be tested electrically after assembly, but before the assembly is fitted to the kettle body and before the steam responsive actuating mechanism is connected to the heater assembly. Furthermore, such a heater assembly can be utilized to construct a non-automatic kettle simply by omitting or covering the second movable thrust member to give an immersion heater assembly generally similar to that described in our co-pending British Patent Application No: 8,000,496.

The steam responsive actuating mechanism, can be constructed as a separate assembly which is secured to the mounting after being thermally tested.

In a second form, which is the preferred form, the mounting serves as part of the steam responsive actuating mechanism and is provided with an integral extension which extends upwards to adjacent the steam vent, so as to reduce the number of expensive precision moldings required, and to simplify the provision of the necessary protection of the electrical components from steam, condensate and flooding with water. This second form of mounting precludes the mounting from being used in a non-automatic kettle, but enables the same dry overload mechanism and immersion heater to be employed. This second form can be designed, according to a preferred feature of the invention, to form (together with the dry overload mechanism), to form a complete switching means assembly which is very simply assembled during manufacture so as to be incapable of being disassembled without being at least partially broken or destroyed. This enables only pretested and fault free switching assemblies to be assembled into the kettles, and any damage to the switching assemblies due to unauthorized tampering can be easily detected, both of which features can reduce warranty costs.

Either form of mounting can be adopted by the kettle manufacturer without requiring alteration of the kettle body, the immersion heater, or the dry overload mechanism, and in addition without requiring alteration of the working parts of the steam responsible actuating mechanism and the protective cover or housing.

The use of the preferred thermal insulating member to carry the dry overload mechanism greatly simplifies thermal testing because the complete assembly can be simply placed on a hot temperature controlled testing surface to determine whether or not the dry overload mechanism and switching means respond in the assembled state within a predetermined temperature range, because the thermal insulating member will protect the thermoplastics materials used, for example in the mounting, from thermal damage. Furthermore, the steam responsive actuating mechanism can be tested in conjunction with the switching means by simply directing a current of heated fluid, e.g. air, at a predetermined temperature onto the dry overload mechanism.

BRIEF DESCRIPTION OF THE DRAWING

The invention will be described further, by way of example, with reference to the accompanying drawings, wherein.

DETAILED DESCRIPTION

The electric kettle body has a wall 10 and is provided with a handle 11, an immersion heater 12, an earth pin connector 13 and a switching means. The switching means comprises an assembly of a dry overload responsive actuating mechanism 14, an electrical connector and switch arrangement 16, a steam responsive actuating mechanism 18, and is provided with a cover 15 or housing.

The immersion heater 12 comprises an element 20 having a metal sheath 21; a metal head having a main panel 22, a peripheral rim 23 and an externally threaded cylindrical extension 24 perpendicular to the main panel; and an elongate post arrangement. As shown in FIGS. 1, 2, 3 and 6 the elongate post arrangement comprises a first portion in the form of a first post 25 which is secured perpendicularly to the main panel above a central axis 26 of the head, and a second portion in the form of a longer post 27 secured to the main panel so as to be parallel with and slightly above the post 25. The free end parts of the posts are internally threaded to receive two fasteners 30 one of which clamps the earth pin connector 13 directly to the post 27. The ends of the sheath 21 are secured to the main panel so as to leave cold tails 28 of the element projecting into a socket defined by the extension and the main panel, and an intermediate portion of the sheath is secured across one face of the main panel to provide a hot spot 29.

The immersion heater 12 is secured in a predetermined position in the body by a internally threaded clamping ring 31 which is screwed onto the extension 24 so as to clamp the rim 23 and a seal 32 to the wall 10. The alignment of the heater 12 with respect to the body can be maintained as the ring is tightened by locating the kettle in a jig (not shown) which holds the posts 25 and 27 in a predetermined position so as to prevent the head being turned by the turning of the ring.

Figure 3:
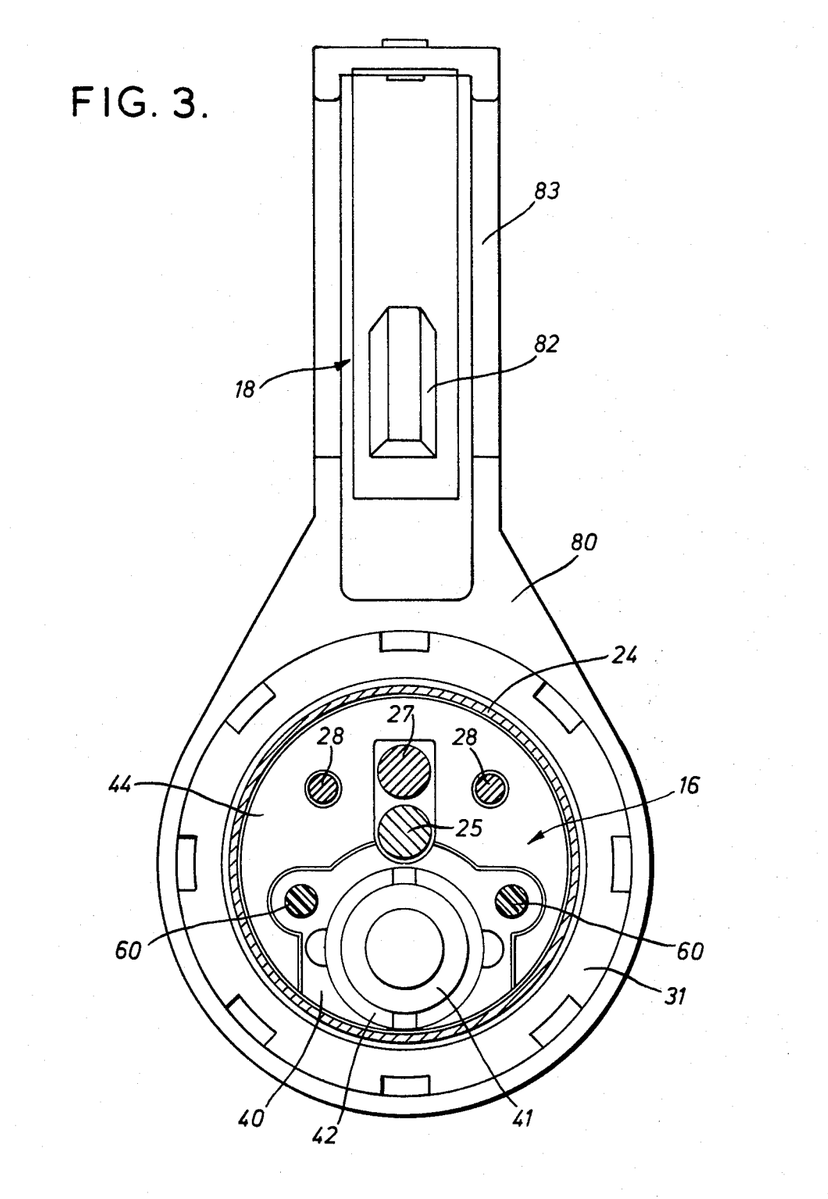
FIG. 3 shows an inside face of the switching means of FIG. 1, with portions of the immersion heater removed, to show portions of the switching means which are common to all of the embodiments of the switching means.

The dry overload responsive actuating mechanism 14 comprises a molded member 40 of a heat resistant thermal insulating material, a bimetal 41 of stressed snap-acting dished form located on one side of the member 40 by a cylindrical flanged metal retainer 42, and a push rod 43 which extends perpendicularly from the bimetal through a cylindrical guideway through the member 40 to project from the other side of the member 40. The member 40 is apertured as shown in FIG. 3, to provide passages through which the posts 25 and 27 and cold tails 28 extend, and to receive projections or pegs 60 of the switch arrangement 16. Said one side of the member 40 provides a flat abutment face 44 which confronts and abuts the main panel 22, and is shaped to allow the bi-metal to snap from a convex dished form to a concave dished form, upon being heated to a predetermined temperature by the hot spot 29, to thrust the push rod 43 away from the hot spot.

Figure 4:
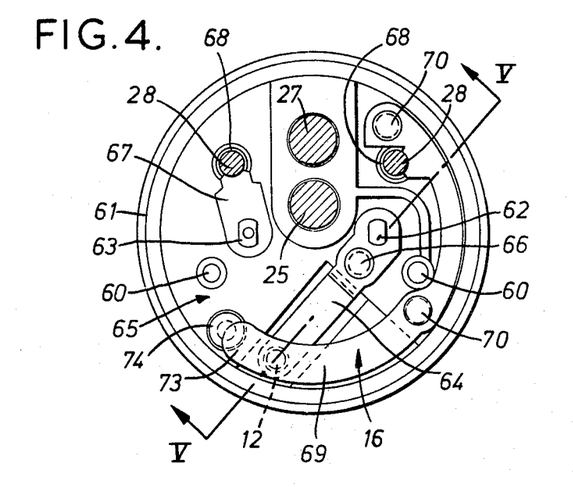
FIG. 4 shows an inside face of a mounting and electrical components common to all said embodiments.
Figure 5:
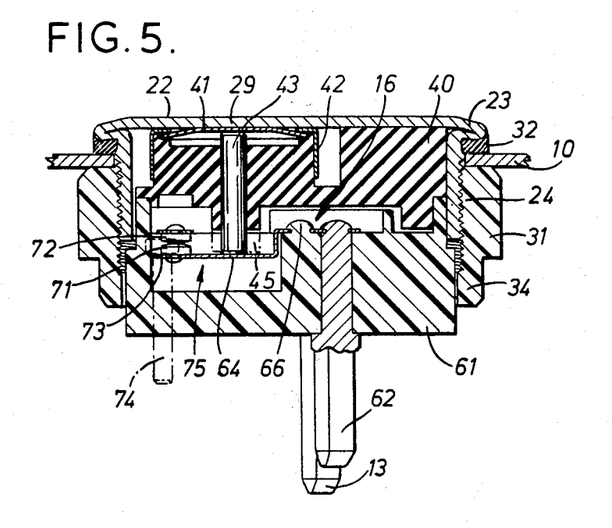
FIG. 5 shows a cross section taken on the line V—V in FIG. 4, with an element and a steam responsive actuating mechanism removed.

The electrical connector and switch arrangement 16 comprises a mounting 61 together with a set of switch contacts, and electrical connectors which are arranged on the mounting as shown in FIGS. 4 and 5. The connectors comprise a live electrical supply connector pin 62, and a similar neutral pin 63. The pin 62 extends through the mounting and is rivetted over to secure one end of a first spring connector 64 to an inside face 65 of the mounting. Said one end is further held by a projection 66 of the mounting. The neutral pin 63 similarly extends through the mounting and is rivetted over to secure a neutral connector 67 to the mounting which neutral connector has an extension which is clamped to one of the cold tails 28 by a cylindrical collar 68. A second connector 69 is secured to the inside face by two projections 70, and similarly has an extension which is secured to the other cold tail by a further collar 68. The set of switch contacts comprises a first contact 71 mounted on a free end of the connector 64 and a second contact 72 mounted on a free portion of the second spring connector 69.

The first connector 64 is arranged as shown in FIG. 5 so that it can be displaced by the push rod 43 to move the first contact away from the main panel so as to open the contacts, and the second spring connector 69 has an extension 73 which can be moved by a second push rod 74 in a direction towards the main panel so as to open the contacts.

The spring connectors 64 and 69 are arranged so that when the first contact 71 is moved outwards away from the head, the second contact is prevented from following the first contact for more than a slight distance by the extension 73 abutting either the push rod 74 or the mounting adjacent the push rod; and similarly when the second contact is moved inwards towards the head, any movement of the first contact is restricted by the connector 64 abutting the push rod 43, or optionally an extension 45 of the molded member 40 (shown in broken lines in FIG. 5). Furthermore the contacts are caused to wipe across each other slightly during the initial part of each opening movement and the final part of each closing movement, so as to be self cleaning.

The inside face of the mounting and the other side of the molded member 40 are shaped to interengage and define therebetween a switch contact chamber 75, and the projections 60 are provided with terminal heads, after assembly, to secure together the mounting and the member 40. The peripheral surfaces of the member 40 and an adjacent portion of the mounting 61 are shaped so as to be a close sliding fit in the socket, and the outside face of the mounting is provided with a recess 77 and an abutment 76 which enables the mounting and member 40 to be clamped to the head by the second of the two fasteners 30, independently of the earth pin connector 13 which is partially accommodated in said recess.

The second push rod 74 of stepped cylindrical form extends through a stepped cylindrical way in the mounting.

Figure 7:
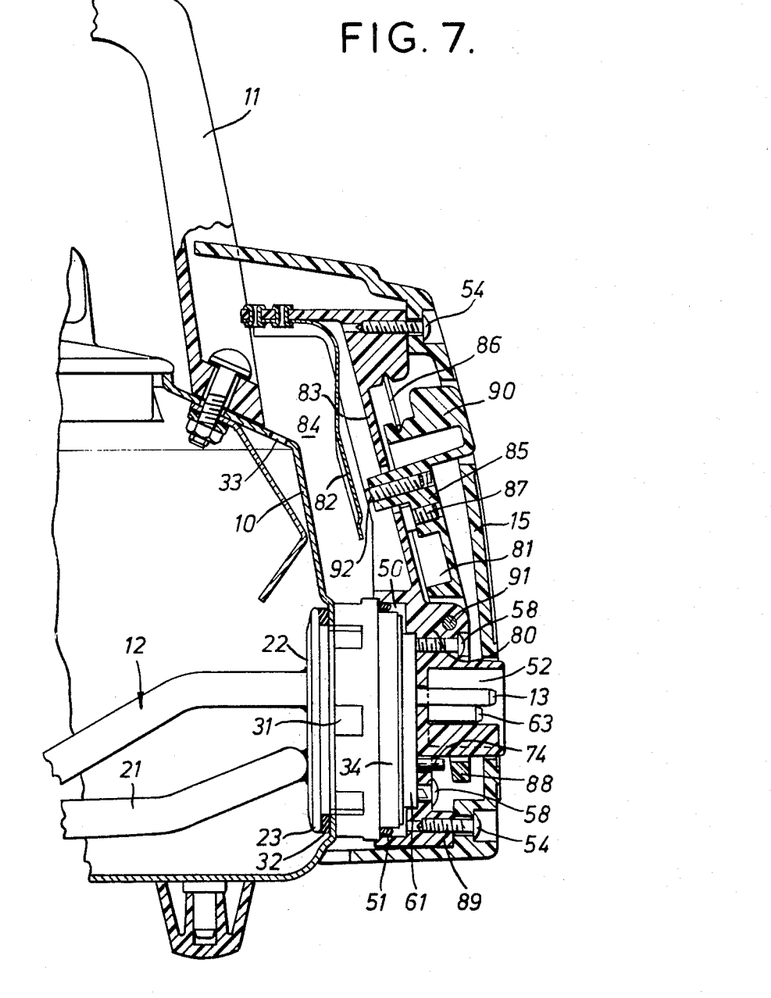
FIG. 7 shows a part sectional general arrangement of an automatic kettle incorporating the third embodiment.

The steam responsive actuating mechanism 18 comprises a body 80, a lever 81, and a steam actuable bi-metal 82. The body 80 has an upper portion 83 which extends upwards from adjacent the ring 31 so as to confront the wall 10 of the kettle body to define a steam space 84 therebetween as shown in FIG. 7. The bi-metal 82 is mounted, at its upper end on a top part of the upper portion 83 so as to depend within the steam space alongside that side of the upper portion which confronts the wall 10. The lever 81 is pivotally mounted, as hereinafter described, so as to have an upper portion 85 which lies alongside the other side of the upper portion 83, and a top part of the portion 85 is engaged by a spring 86 which is located by the top part of the body, and is arranged so that the lever 81 is movable between a first stable position in which an abutment 87 of the lever abuts the upper portion 83 and a second stable position in which the abutment 87 is spaced apart from the upper portion 83. The lever has a lower portion 88 which is in the first position is spaced apart from the second push rod 74, and in the second position abuts the push rod so as to hold the contacts 72 away from the contact 71, and further abuts a lower portion 89 of the body. As shown in FIG. 7 the upper portion 85 is shaped to provide a knob 90 which projects through the cover 15 to allow the lever to be moved manually to the first position.

The spring 86 is of round wire formed to S or Z shape so as to have top and bottom parallel limbs which are self centering in V or U shaped confronting grooves in the top parts of the body and lever, which limbs are connected by an intermediate transverse limb, and the arrangement is such that the compression on the spring is increased to a maximum when the lever is in an intermediate position between the first and second positions so as to urge the lever out of said intermediate position.

The wall 10 has an upper steam vent 33 which allows steam to pass from the kettle into the steam space 84 so as to heat the bi-metal 82, whereby to cause the bi-metal to bend outwards away from the wall 10 to contact an abutment 92 on the upper portion 85, which abutment extends through an aperture in the upper portion 83 into the steam space, so that the movement of the bi-metal is transmitted to the lever to cause the lever to move to the second position via an unstable intermediate position.

The foregoing description applies generally to all the embodiments shown in the drawings, but these embodiments differ in some details, and in the protection of the switch contact chamber 75 from ingress of steam and water.

Figure 1:
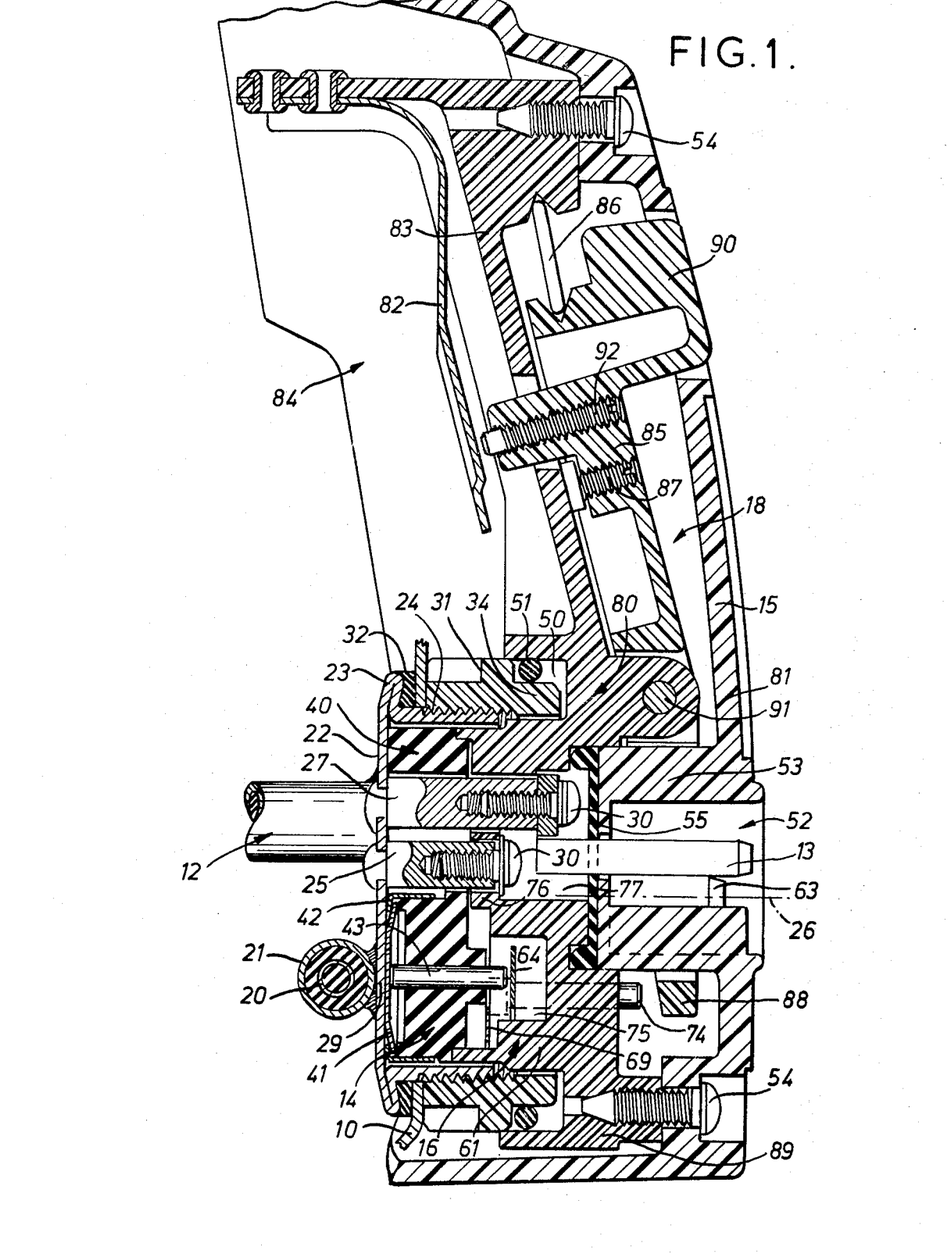
FIGS. 1 and 2 show vertical cross sections through an immersion heater and first and second embodiments of switching means, secured to the body of a kettle.
Figure 2:
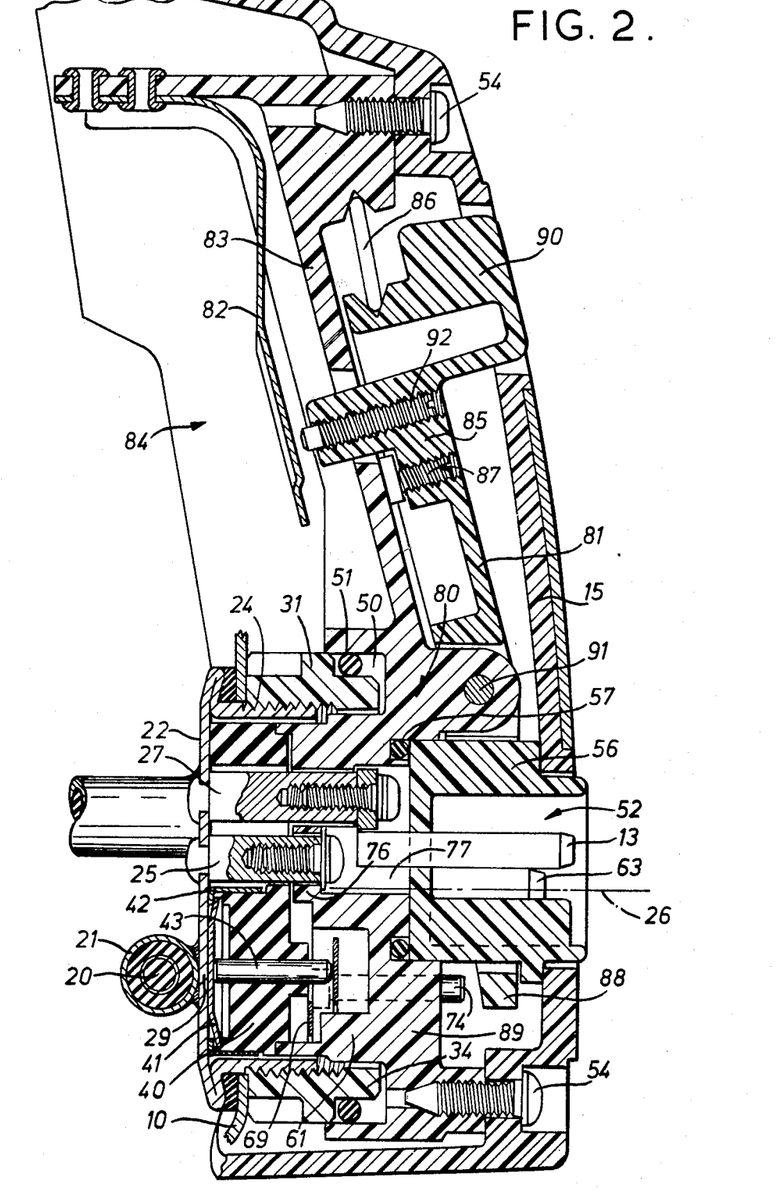
Figure 6:
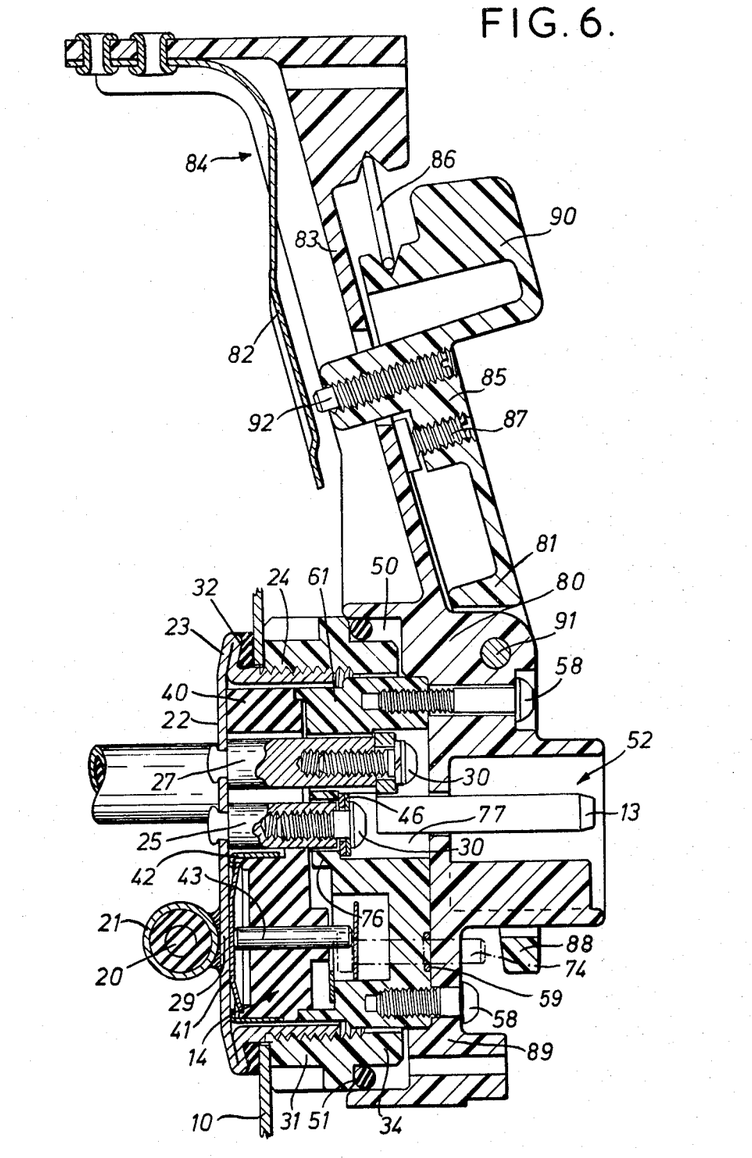
FIG. 6 shows a vertical cross section similar to FIGS. 1 and 2, and shows a third embodiment of switching means.

As shown in FIGS. 1, 2 and 6 the clamping ring 31 is provided with an extension 34 which extends into an annular recess 50 in the body 80, and a sealing ring 51 is compressed between the body and the extension 34 so as to seal the joint therebetween and close the recess 50 whereby to prevent steam, condensate water and flood water, which flows down the steam space 84 from entering the socket in the head and the switch contact chamber 75. Furthermore the second push rod 74 is a close sliding fit in the aforesaid way so as to effectively seal the way against ingress of any steam or water which may, upon rare occasions, pass round the body to the side remote from the wall 10, but if necessary the push rod or way may have a small amount of silicone grease applied thereto to serve as further seal in said way.

In each of the embodiments an outwardly open plug socket 52 is provided to receive an electrical supply connector (not shown), for connecting to the live, neutral and earth pins, 62, 63 and 13 which extend into said plug socket 52.

In the first embodiment shown in FIG. 1 the mounting and body are constituted by a single molding of electrically insulating material, and the plug socket is provided on an extension 53 of the cover 15, which is secured to the integral molding by two screws 54 so as to clamp a soft flexible plastics member 55 to the outside face of the integral molding whereby to provide a seal arrangement which embraces the live, neutral and earth pins and serves to close the recess 77 which is provided in the integral molding to provide access to and accommodation for the fasteners 30.

In the second embodiment shown in FIG. 2 the mounting and body are again integral, but the plug socket is defined by a hollow molding 56 of flexible plastics material which serves as a sealing arrangement by embracing the pins and closing the recess 77, this sealing arrangement may optionally include a sealing ring 57 which is trapped between the outside face of the integral molding and a peripheral portion of the hollow molding 56.

The hollow molding is clamped in place by the cover 15.

In the third embodiment shown in FIG. 6 the mounting 61 and the body 80 are separate molding held together by screws 58, so as to trap a sealing member 59 around the second push rod 74 to seal the way. The plug socket 52 is formed integrally with the body molding, and the recess 77 is filled with a sealing material so as to provide a sealing arrangement which closes the recess.

As shown in FIGS. 1, 2 and 6 the lever 81 is supported on a pivot 91 which is located on the body 80 above the socket 52, and the lower portion 88 of the lever extends around the plug socket. The abutments 87 and 92 are threaded inserts in the upper portion 85 so as to be presettable or adjustable to determine the first position and to permit the relationship between the lever and the bi-metal 82 to be adjusted or preset so that the switch contacts are opened when the bi-metal 82 reaches a predetermined temperature. These inserts may be locked in position by the application of a sealing compound to the outside face of the upper portion 85 to close the openings in which the outside ends of the inserts are disposed.

Figure 9:
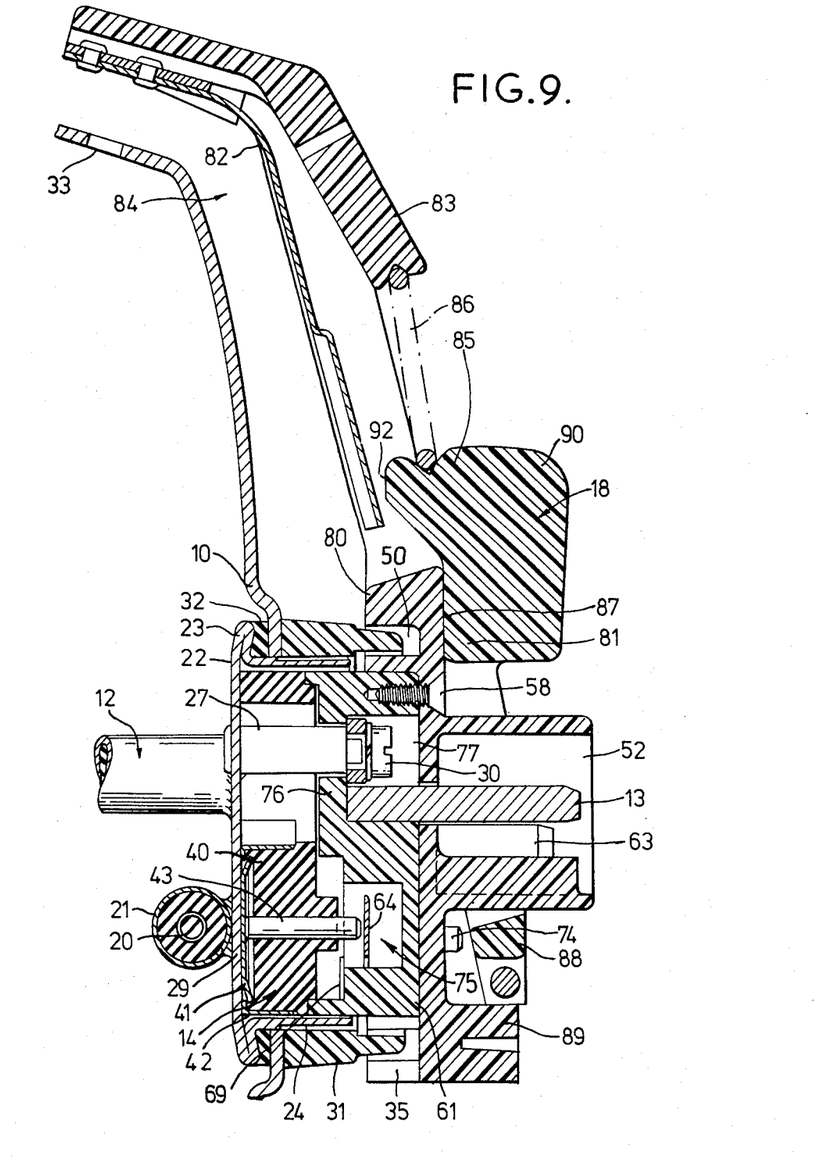
FIG. 9 is a vertical cross section similar to FIG. 1 showing a fourth embodiment of switching means, which employs many of the components of the first, second and third embodiments.

The embodiment shown in FIG. 9 is generally similar to the embodiment shown in FIG. 6, but differs therefrom primarily in that the annular recess 50 is formed to provide a drain path to a bottom opening 35, in that the lever 81 is pivotally supported on that portion of the body which defines the plug socket 52, in that the lever 81 integrally incorporates the abutments 87 and 92, and in that the mounting is clamped in place by the earth pin which is mounted on the post 27, the post 25 being omitted.

Figure 8:
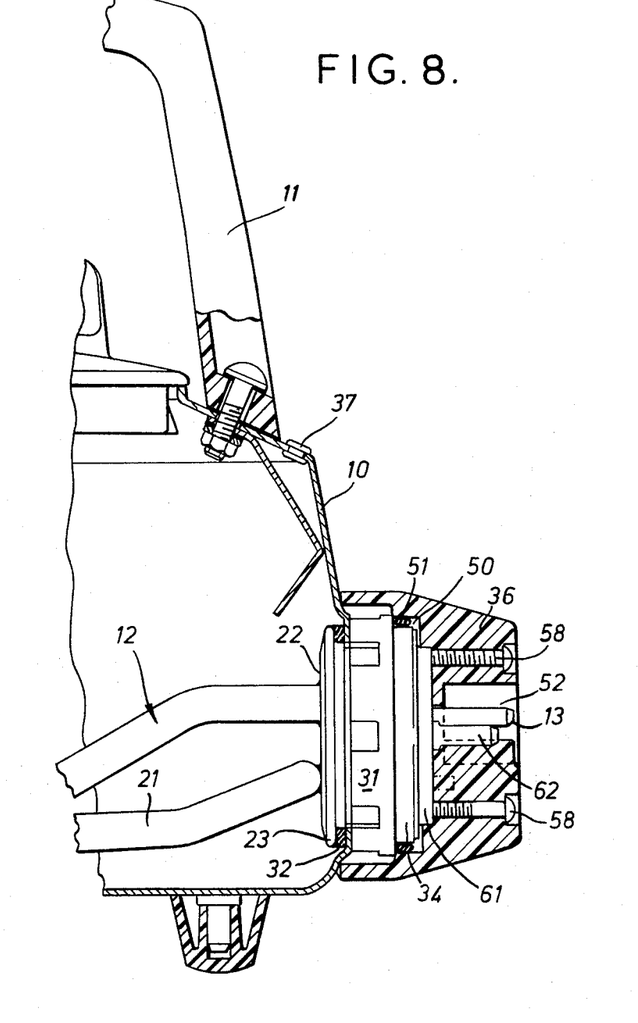
FIG. 8 shows a part sectional arrangement of a non-automatic kettle employing portions of the third embodiment.

The embodiment shown in FIG. 6 has the advantage that, as shown in FIG. 8, a non-automatic kettle can be constructed simply by substituting a simple cover 36 in place of the steam responsive actuating mechanism 18 and the cover 15, and by inserting a stopper 37 into the steam vent 33. The second push rod 74 may be omitted or blanked off by the cover 36.

This advantage can be obtained also from the embodiment shown in FIG. 9, but not from the first and second embodiments shown in FIGS. 1 and 2, because of the integral molding of the body and mounting. This integral molding has the alternative advantages of obviating the screws 54 and their sockets in the mounting; increasing the structural strength of the arrangement 16 and decreasing the manufacturing and assembly cost of the arrangement 16; enabling the way for the second push rod 74 to be accurately molding to obviate problems due to mis-alignment of the separately molded mounting and body; and simplifies the provision of and any modification of the plug socket and the sealing arrangement, while enabling the same dry overload mechanism, heater, clamping ring, and electrically conductive components to be used also in a non-automatic kettle having the mounting and cover 36 of the embodiment shown in FIGS. 6 and 8. Furthermore, the switch means of FIGS. 1 and 2 can be assembled as an assembly in which the switch contacts and electrical components in the switch contact chamber 75 can not be tampered with unless the pegs 60 or the heads thereon are damaged; and the switching means can be tested as an assembly simply by making the necessary electrical connections to the pins, placing the abutment face 44 on a test surface heated to a controlled temperature and blowing hot air onto the bimetal 82, with minimal risk of any thermal damage resulting to the integral molding.

The invention is not confined to the foregoing details and many variations are possible within the scope of the invention as defined by the appended claims. For example, a thermal insulating washer 46 may be interposed between the fastener 30 and the abutment 76, as shown in FIG. 6 to minimize heating of the mounting by heat connected from the hot spot along the post 25.

It will be readily appreciated that the construction of the switching means and the provision of the seal 51 between the body and the clamping ring effectively prevents any ingress to the socket or switch chamber 75 of any steam or flood water which may descend within the steam space. The other portions of the sealing means prevent any of such steam or water which may pass around the body to the outer space between the body and the cover 15 from entering the socket or switch chamber via any aperture, recess or way in the switching means directed towards said outer space.

The sealing of the pins to the plug socket is of lesser importance in some embodiments in so far as this steam and flood water is concerned, because the mouth of the plug socket is not accessible from either the steam space or the outer space but only from outside the cover; but if it is desired to protect the switch contacts against damage caused by accidental immersion of the lower parts of the kettle in water, the sealing of the pins can be helpful. However, it should be understood that some leakage into the switch chamber could possibly arise if a hot kettle was immersed in cold water for a period sufficient to generate a vacuum within the switching means (due to thermal contraction of the enclosed air) sufficient to overcome some part of the sealing means.

Furthermore, with the exception of the head rim seal 32 of well proven form, the invention obviates the use of vulnerable diaphragm and other seals in contact with heated components, and seals clamped between the kettle body and the switching means, all of which seals are subjected to thermal or thermally caused mechanical stresses which can give rise to failure of the seals, while allowing a steam vent, rather than the alternative of the vunerable and easily blocked known steam tube, to be employed.

I claim:

1. In an electric kettle comprising a kettle body for holding liquid with an electrical immersion heater and switching means mounted thereon; wherein the immersion heater comprises a metal sheathed element permanently mounted on a metal head so as to produce a hot spot on the head, wherein the switching means comprises a set of electrical switch contacts, a dry overload responsive actuating mechanism responsive to overheating of the hot spot to open the set of switch contacts and a steam responsive actuating mechanism; and wherein the set of switch contacts, electrical connectors connected to the element and electrical connectors for receiving an electricity supply are all mounted on an electrical insulating mounting, the combination comprising:

(a) the set of switch contacts comprises a first contact movable in a first direction to open the set of contacts, and a second contact movable in the opposite direction to open the set of contacts;
    (b) the dry overload responsive actuating mechanism is disposed between the mounting and the head so that a bimetal device of the dry overload mechanism abuts the hot spot, and includes a first movable member which extends from the bimetal device to the first contact;
    (c) the insulating mounting supports a second movable member which extends from the second contact through a way within the mounting to the steam responsive actuating mechanism for actuation by the latter;
    (d) the set of switch contacts and the electrical connectors connected to the element are secured to one side of the mounting, which one side confronts the dry overload responsive actuating mechanism including a thermal insulating member; and
    (e) the thermal insulating member and the insulating mounting are shaped to define a switch contact chamber therebetween, in which chamber the set of contacts are disposed; and
    (f) the movable members extend into said chamber from opposite directions.

2. In a kettle as claimed in claim 1, wherein
the thermal insulating member engages a main panel of the head, locates the bimetal device in contact with the hot spot, and slidably supports the first movable member, and
the dry overload responsive actuating mechanism serves to limit the movement of the first contact in the direction of the head as the second contact is moved to open the contacts.

3. In a kettle as claimed in claim 1, wherein
said first direction is away from the metal head,
said movable members are thrust members,
the contacts are arranged so as to slide in contact with each other during initial opening movement of the contacts in said directions, and
the contacts are arranged so as to slide in contact with each other during final closing movement of the contacts in said directions.

4. In a kettle as claimed in claim 1, wherein
the steam responsive actuating mechanism comprises a body having a lower portion and an upper portion, a steam bimetal disposed at one side of the upper portion, and an actuating lever pivotally mounted at the opposite side of the body;
said second movable member extends through said lower portion; and
an upper portion of the actuating lever is movable from a first stable position in said first direction by actuation of said bimetal to move a lower portion of said actuating lever in said opposite direction to move said second movable member in said opposite direction.

5. A kettle as claimed in any preceding claim, wherein the steam responsive actuating mechanism comprises a body having a lower portion and an upper portion, a steam bimetal disposed at one side of the upper portion, and an actuating lever pivotally mounted at the opposite side of the body; wherein said second movable member extends through said lower portion; and wherein an upper portion of the actuating lever is movable from a first stable position in said first direction by actuation of said bimetal to move a lower portion of said actuating lever in said opposite direction to move said second movable member in said opposite direction.

6. In a kettle as claimed in claim 5, wherein
said upper portion of the lever includes an adjustable abutment to enable said first stable position to be adjusted or preset, and
said upper portion of the lever includes an adjustable abutment to enable the actuation of the lever by the bimetal to be adjusted or preset.

7. In a kettle as claimed in claim 1, wherein
said head comprises a cylindrical externally threaded extension which extends through a wall of the kettle body to define the periphery of a socket in the head;

the insulating mounting is located in said socket by a fastener secured to said head; and the head is secured to the wall by an internally threaded clamping ring secured around said threaded extension.

8. In a kettle as claimed in claim 4, wherein said head comprises a cylindrical externally threaded extension which extends through a wall of the kettle body to define the periphery of a socket in the head;

the mounting is located in said socket by a fastener secured to said head;

the head is secured to the wall by an internally threaded clamping ring secured around said threaded extension;

said clamping ring extends into a recess formed in said one side of the lower portion of the body, and a sealing ring is disposed in said recess to engage said clamping ring and said body to prevent ingress of steam or water into said socket.

9. In a kettle as claimed in claim 1, further including a molded plug socket to receive a mains connector, wherein said electrical connectors for receiving an electricity supply comprise pins which extend through the mounting; and an earth pin is secured directly to the head by a fastener so as to extend into said plug socket.

10. In a kettle as claimed in claim 4, further including a molded plug socket to receive a mains connector, wherein said electrical connectors for receiving an electricity supply comprise pins which extend through the mounting;

an earth pin is secured directly to the head by a fastener so as to extend into said plug socket;

said body and mounting are formed as an integral molding, and a cover or housing is secured to said body to locate a sealing arrangement around said earth pins.

11. In a kettle as claimed in claim 9, wherein a recess is located in said body and said mounting to provide access to the fasteners securing the mounting and earth pin to the head, and said sealing arrangement closes said recess to prevent ingress of steam and water into said recess.

12. In a kettle as claimed in claim 10, wherein said second thrust member serves as, or as part of, sealing means to seal said way against ingress of steam or water into said way.

13. In a kettle as claimed in claim 1, wherein said body and mounting are moldings mechanically secured together by fasteners, and the steam responsive actuating mechanism is detachable and replaceable by a simple cover which blanks off or covers the second movable member to leave the kettle capable of being operated as a non-automatic kettle.

14. In a kettle as claimed in claim 4 further including a molded plug socket to receive a mains connector, wherein said electrical connectors for receiving an electricity supply comprise pins which extend through the mounting;

an earth pin is secured directly to the head by a fastener so as to extend into said plug socket;

said plug socket is integrally provided in said body, a recess is located in said mounting to provide access to the fasteners or fastener securing the insulating mounting and earth pin to the head, a sealing arrangement prevents ingress of steam and water into said recess, and a sealing ring clamped between said body and said mounting seals the way around the second movable member.

* * * * *